United States Patent
Juvekar et al.

(10) Patent No.: US 12,047,518 B2
(45) Date of Patent: Jul. 23, 2024

(54) DELAY BASED PUF IMPLEMENTATION WITH INTEGRATED DETERMINATION OF OPTIMUM CONFIGURATION

(71) Applicant: Analog Devices, Inc., Wilmington, MA (US)

(72) Inventors: Chiraag Juvekar, Cambridge, MA (US); Abhijit Kuvar, Woburn, MA (US)

(73) Assignee: Analog Devices, Inc., Wilmington, DE (US)

( * ) Notice: Subject to any disclaimer, the term of this patent is extended or adjusted under 35 U.S.C. 154(b) by 20 days.

(21) Appl. No.: 17/205,561

(22) Filed: Mar. 18, 2021

(65) Prior Publication Data

US 2022/0303145 A1    Sep. 22, 2022

(51) Int. Cl.
*H04L 9/32* (2006.01)

(52) U.S. Cl.
CPC .................. *H04L 9/3278* (2013.01)

(58) Field of Classification Search
CPC ..................................................... H04L 9/3278
See application file for complete search history.

(56) References Cited

U.S. PATENT DOCUMENTS

| | | | |
|---|---|---|---|
| 8,848,905 B1 * | 9/2014 | Hamlet | H04L 9/3278 726/20 |
| 9,083,323 B2 | 7/2015 | Guo et al. | |
| 9,444,618 B1 | 9/2016 | Trimberger et al. | |
| 10,027,480 B2 * | 7/2018 | Lee | H04L 9/088 |
| 10,152,613 B2 * | 12/2018 | Kwong | G11C 11/419 |
| 10,841,107 B2 | 11/2020 | Poo et al. | |
| 2014/0185795 A1 | 7/2014 | Gotze et al. | |
| 2015/0067895 A1 * | 3/2015 | Vasyltsov | H04L 9/3278 726/32 |
| 2015/0319000 A1 * | 11/2015 | Falk | H04L 9/3278 713/189 |
| 2017/0295026 A1 * | 10/2017 | Guilley | G06F 11/263 |
| 2018/0091293 A1 * | 3/2018 | Suresh | H03K 19/003 |
| 2018/0183614 A1 | 6/2018 | Danger et al. | |
| 2020/0044872 A1 * | 2/2020 | Willsch | H04L 9/3278 |
| 2020/0099542 A1 * | 3/2020 | Vasyltsov | H04L 9/3278 |
| 2020/0381372 A1 * | 12/2020 | Kozicki | H01L 23/573 |
| 2021/0250187 A1 * | 8/2021 | Lu | H04L 9/0866 |
| 2022/0303145 A1 * | 9/2022 | Juvekar | H04L 9/0866 |

* cited by examiner

*Primary Examiner* — Phy Anh T Vu
(74) *Attorney, Agent, or Firm* — ArentFox Schiff LLP (57) ABSTRACT

A method and electronic device for configuring a PUF, wherein: PUF cells are configured to use a signal path; determining a winner of racing pairs of PUF cells in a first round and in a second round wherein winners of the first round are raced; the first and second round are repeated for different signal paths; determining, for each signal path, a comparison metric, wherein the comparison metric is based on the count of the outputs of the PUF cells having the signal path in common; determining an optimum signal path for the PUF from the respective comparison metrics; and configuring the PUF to use the optimum signal path.

10 Claims, 6 Drawing Sheets

| | Config0 | Config1 | ... | Config7 |
|---|---|---|---|---|
| RO0 | $\|\Delta_{01\_c0}\|$ | $\|\Delta_{01\_c1}\|$ | ... | $\|\Delta_{01\_c7}\|$ |
| RO1 | | | | |
| RO2 | $\|\Delta_{23\_c0}\|$ | $\|\Delta_{23\_c1}\|$ | ... | $\|\Delta_{23\_c7}\|$ |
| RO3 | | | | |
| ROw1 (0\|1) | $\|\Delta_{w12\_c0}\|$ | $\|\Delta_{w12\_c1}\|$ | ... | $\|\Delta_{w12\_c7}\|$ |
| ROw2 (2\|3) | | | | |
| MIN | $\min_{c0} = \min(\|\Delta_{01\_c0}\|, \|\Delta_{23\_c0}\|, \|\Delta_{w12\_c0}\|)$ | $\min_{c1}$ | ... | $\min_{c7}$ |

|  | Config0 | Config1 | ... | Config7 |
|---|---|---|---|---|
| R00 | $\|\Delta_{01\_c0}\|$ | $\|\Delta_{01\_c1}\|$ | ... | $\|\Delta_{01\_c7}\|$ |
| R01 | | | | |
| R02 | $\|\Delta_{23\_c0}\|$ | $\|\Delta_{23\_c1}\|$ | ... | $\|\Delta_{23\_c7}\|$ |
| R03 | | | | |
| R0w1 (0\|1) | $\|\Delta_{w12\_c0}\|$ | $\|\Delta_{w12\_c1}\|$ | ... | $\|\Delta_{w12\_c7}\|$ |
| R0w2 (2\|3) | | | | |
| MIN | $\min_{c0} = \min(\|\Delta_{01\_c0}\|, \|\Delta_{23\_c0}\|, \|\Delta_{w12\_c0}\|)$ | $\min_{c1}$ | ... | $\min_{c7}$ |

FIG.4

|  | Cf0 | Cf1 | Cf2 | Cf3 | Cf4 | Cf5 | Cf6 | Cf7 |
|---|---|---|---|---|---|---|---|---|
| R00 | 18 | 1 | 3 | 14 | 14 | 5 | 3 | 3 |
| R01 | | | | | | | | |
| R02 | 2 | 12 | 0 | 11 | 15 | 1 | 17 | 14 |
| R03 | | | | | | | | |
| R0w1 (0\|1) | 4 | 2 | 15 | 10 | 7 | 0 | 11 | 14 |
| R0w2 (2\|3) | | | | | | | | |
| MIN | 2 | 1 | 0 | 10 | 7 | 0 | 3 | 3 |

FIG. 9

DELAY BASED PUF IMPLEMENTATION WITH INTEGRATED DETERMINATION OF OPTIMUM CONFIGURATION

TECHNICAL FIELD OF THE DISCLOSURE

The present disclosure relates generally to physically unclonable functions (PUF) and, more specifically, to methods, electronic devices and integrated circuits for configuring delay based PUFs.

BACKGROUND

A PUF can comprises a device or circuitry that generates an output dependent on unique physical properties of the device. For example, variations in manufacturing process and parts produce a chip comprising electrical circuits with unique hardware characteristics as even the smallest variation (e.g., process dependent variations in delays) provides uniqueness.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

The systems, methods and devices of this disclosure each have several innovative aspects, no single one of which is solely responsible for all of the desirable attributes disclosed herein. Details of one or more implementations of the subject matter described herein are set forth below and the accompanying drawings.

Conventional approaches for securing an electronic device involve storing a secret key inside the device. Ensuring that the secret key is not accessible from outside the system, for example through unauthorized firmware reads or side channel leakage, is crucial to achieving system security. The keys can be stored in a non-volatile memory (NVM) such as eFuse or eFlash, but they can remain susceptible to the invasive or non-invasive attack mechanisms. Protecting against these attacks also requires power-consuming active tamper detection circuits and costlier NVM options.

To overcome the above-described weaknesses, PUFs may be utilized. PUFs are innovative circuit primitives that extract randomness from physical characteristics of integrated circuits. PUFs are naturally resistant against reverse engineering as instances of the same circuit will yield different values with no way to predict the value of a particular instance. For this reason, PUFs are considered to be "unclonable" in that replicating the circuit will not replicate the PUF value. For microcontroller (MCU) systems, PUFs offer an alternative to high entropy secret key generation. For non-MCU embedded devices, PUFs can be used to generate a unique ID for supply chain traceability as a "digital fingerprint" of the device. Generally, PUFs can enable low-cost authentication of individual integrated circuits (ICs) and generate volatile secret keys for cryptographic operations. PUFs are a step forward to improve the security level compared to traditional NVM because they resolve security issues, such as active data-probing and transferring the security key from outside.

The present disclosure relates to delay based PUF cells that are configured to generate output bits. Path delays in an IC are statistically distributed due to random manufacturing variations. Delay-PUFs exploit this intrinsic randomness to produce an unpredictable, unclonable device unique response. Some examples of delay-PUFs are Arbiter PUF and ring oscillator (RO) PUF, where the digital response is based on comparison of systematically identical path delays.

A conventional technique in using delay-PUFs provides for comparing the frequency of adjacent pairs of PUF cells (also known as "racing") such that each PUF cell is compared or "raced" only once. In RO-PUFs the PUF cell is an RO. This results in full entropy in information theoretic sense, since result of each race is independent of other races. A second technique races adjacent ROs such that each RO is raced twice. This second technique only requires one RO for each bit of output. However, the output generated by the second technique does not generate full entropy since the probabilities of the race outcomes are not independent. A third technique determines a race order based on an input challenge. This third technique does not ensure that each race produces full entropy since the outcomes of each race are not necessarily independent. Further, this third technique may be vulnerable to machine learning attacks or other inferences that determine the true ordering of the ROs. Under such conditions, adversaries can predict the outcome for any input challenge.

Ideally the same PUF instance (a single PUF device) should yield the exact same value every time it is queried. In real life, however, with changes in environmental variations like temperature, supply voltage and noise, PUF output may vary considerably as seen empirically from previous RO-PUF implementations. Variation in PUF output occurs because of inconsistent variations in RO frequencies with change in environmental factors. Bit error rate (BER), when calculated with respect to RO-PUF response at 25° C., could be as high as 10% (19 bit errors in 192-bit response), as seen evidently. This PUF output would be considered unreliable at extreme temperature and it requires a costly error correction (ECC) implementations on-chip. It is desirable to reduce the number of bit errors (increase repeatability) to lower the overhead cost of error correction.

Systems and methods are described herein for generating multiple rounds of races based on the previous rounds of races to preserve maximal entropy in the output of each race. In some embodiments, in each round, the winners of the previous round may be raced against each other, while losers may be raced against losers. If the PUF cells with same history of winning or losing are being compared, one cannot predict the outcome of the current race based on previous race results. Thus, one RO can be used in multiple pairwise comparisons.

An innovative algorithm is proposed to improve the robustness of RO-PUFs. The algorithm proposed herein may enable an optimum configuration for two pairs of ROs to be determined to improve the robustness of PUF response and reduce the BER down. The algorithm can be Register-Transfer Level (RTL) implementable, allowing its hardware design to be modeled in hardware description languages like VHDL. The proposed algorithm may be used to determine and set the optimum configuration of an RO-PUF.

It has been found that the methods and systems of the present disclosure can result in the maximum BER to drop to 1.6% (3 bit errors with 192-bit response) therefore bringing down raw error rate by the factor of ~6× (10% vs 1.6%). In a test environment the algorithm was found to take a small amount of time (for example less than 2 s) to effectively run over all RO blocks and therefore, could potentially save the test time during production of an IC which has this RO-PUF.

Although some embodiments are described with respect to RO PUFs, other implementations may be practiced using any suitable delay based PUF implementation, including for example, an arbiter PUF.

As will be appreciated by one skilled in the art, aspects of the present disclosure may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon.

The following detailed description presents various descriptions of specific certain embodiments. However, the innovations described herein can be embodied in a multitude of different ways, for example, as defined and covered by the claims and/or select examples. In the following description, reference is made to the drawings, where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the present disclosure, when used to describe a range of dimensions or other characteristics (e.g., time, pressure, temperature, length, width, etc.) of an element, operations, and/or conditions, the phrase "between X and Y" represents a range that includes X and Y. If used, the terms "substantially," "approximately," "about," etc., may be used to generally refer to being within +/−20% of a target value, e.g., within +/−10% of a target value, based on the context of a particular value as described herein or as known in the art. For the purposes of the present disclosure, the phrase "A and/or B" or notation "A/B" means (A), (B), or (A and B). For the purposes of the present disclosure, the phrase "A, B, and/or C" or notation "A/B/C" mean (A), (B), (C), (A and B), (A and C), (B and C), or (A, B, and C).

Other features and advantages of the disclosure will be apparent from the following description and the claims.

Example RO-PUF

An example of a delay-PUF is an RO-PUF, which typically includes a set of n identically designed ROs whose frequencies will have process dependent variations. The input to an RO-PUF is a selection, referred to as racing order henceforth, that selects pairs of ROs to be compared to give a digital response as shown in the illustrative embodiment of FIG. 1. This comparison order or racing order is either fixed (in case of weak-PUFs) or a variable challenge (in case of strong-PUFs).

Figure 1:
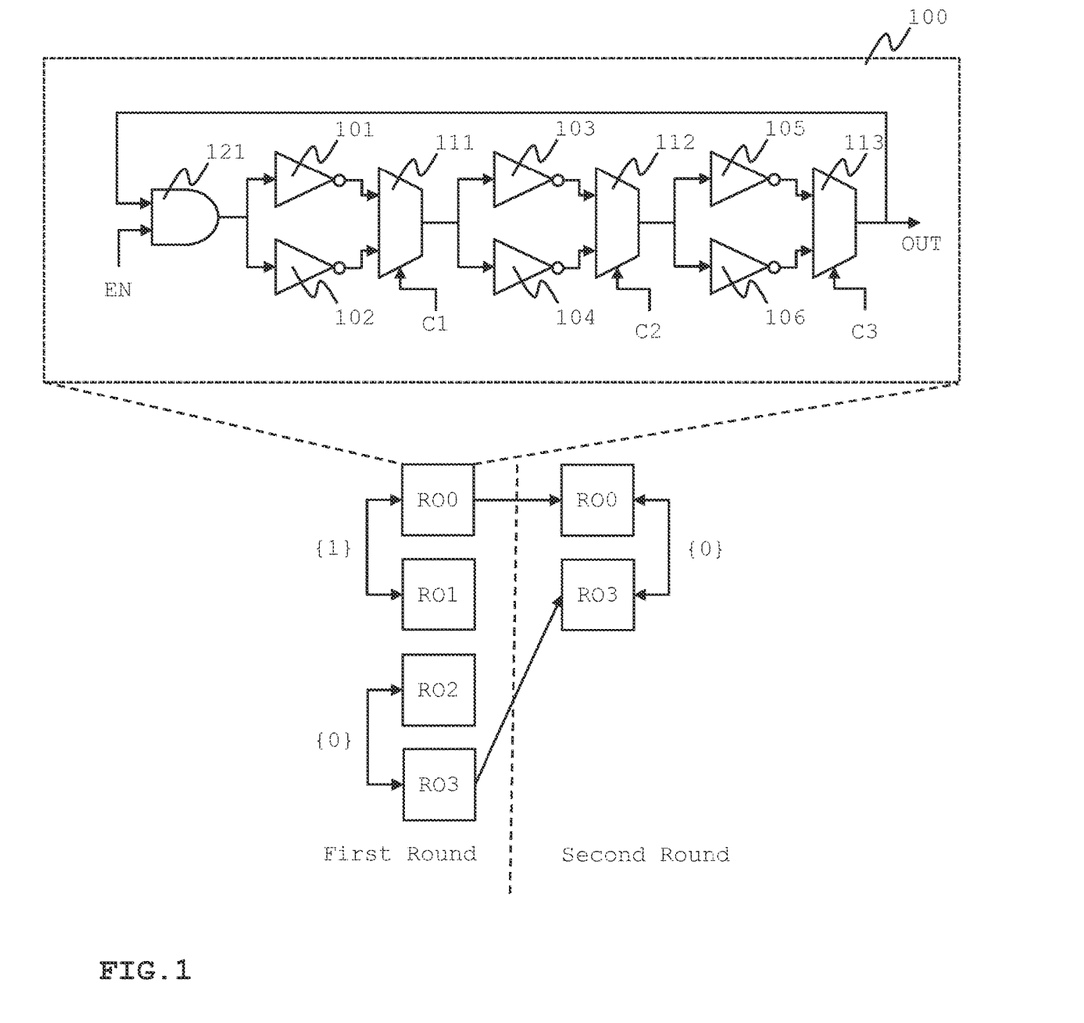
FIG. 1 is an illustrative block diagram of a PUF cell used to generate a PUF output according to some embodiments of the present disclosure.

FIG. 1 shows a block diagram of an example configurable RO (CRO) 100 used to generate a PUF output, in accordance with some embodiments. FIG. 1 illustrates an RO including AND gate 121 and inverters 101-106. In the illustrative embodiment of FIG. 1, the PUF cell 100 is an RO circuit that generates an output that oscillates between logical one and zero. Due to process variations, there may be differences between the observed frequencies of oscillation for ROs designed to operate at the same frequency.

AND gate 121 combines the output of the RO with an input signal EN (enable). The input signal may be provided by a control circuitry (e.g., 310 in FIG. 3). In the illustrative embodiment, an input of zero disables the RO, since the output of the AND gate 121 will be held at zero and will not oscillate. In the illustrative embodiment, an input of 1 can be used to enable to the RO, for example in order to race the oscillators. In some embodiments, multiple PUF cells may be enabled substantially simultaneously (e.g., using a shared signal line).

Inverters 101-106 logically invert received input. The output OUT is fed back into the AND gate 121 to create continuing oscillation. In some embodiments, the output OUT may be buffered in any suitable manner. In some embodiments, the output OUT is provided to a multiplexer, counter, comparator, and/or any other suitable circuit element for comparing PUF cell outputs.

CRO 100 may be used to improve reliability of the RO-PUF. Hereto, a traditional RO architecture may be modified by inserting control circuitry or MUX 111-113 in between the inverters 101-106 as shown in FIG. 1. According to selection input C1-C3 each MUX 111-113 select either upper/lower inverters (the upper inverters are depicted 101, 103 and 105, the lower inverters are depicted 102, 104 and 106). For three different values of C1, C2, C3 the CRO 100 can behaves as an eight different RO (different logical paths) each including three cascaded inverters and each logical RO may produce different frequency with respect to others due to manufacturing process variations.

In FIG. 1, below CRO 100 example racing results for racing four ROs (RO0-R03) are shown, each RO0-R03 being similar to CRO 100. In a first round RO0 and RO1 are raced, resulting in RO0 as winner generating a binary value 1 (depicted {1}). In the first round RO2 and RO3 are also raced, resulting in RO3 as winner generating a further binary value 0 (depicted {0}). In a second round the winners of the first round, i.e., RO0 and RO3 are raced, resulting in RO3 as winner generating a further binary 0.

Figure 2:
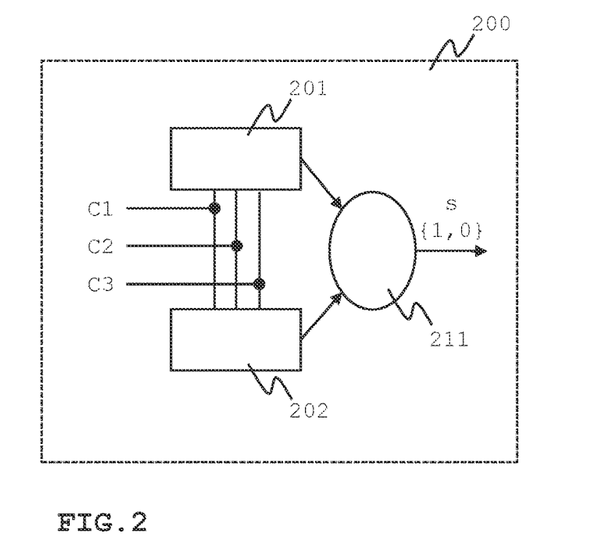
FIG. 2 is an illustrative block diagram of a configurable ring oscillator PUF according to some embodiments of the present disclosure.

By using m-stages of MUX (in FIG. 1m equals 3), this architecture may be configured as an RO-PUF with $2^m$ number of logical ROs. A basic block diagram of a CRO-PUF is shown in the illustrative embodiment of FIG. 2. The same selection lines (challenge) C1, C2 and C3 may be applied to both upper CRO 201 and lower CRO 202. Each CRO 201, 202 may be similar to CRO 100 of FIG. 1. Comparator 211 may produce a response bits depending upon whether CRO 201 or CRO 202 having higher frequency for each value of challenge. Hence, when using the configuration of CRO 100 for each of CRO 201 and CRO 202 it is possible to obtained eight different pair of frequencies for CRO1 and CRO2 due to process variations. To improve the reliability, typically during an enrollment stage, only that pair of frequency may be selected having highest frequency separation or least error. This chosen configuration may be stored in an NVM on the chip where the CRO-PUF is embedded and read back whenever the PUF is queried for recovery.

Example Racing Strategy for Delay-PUFs

Figure 3:
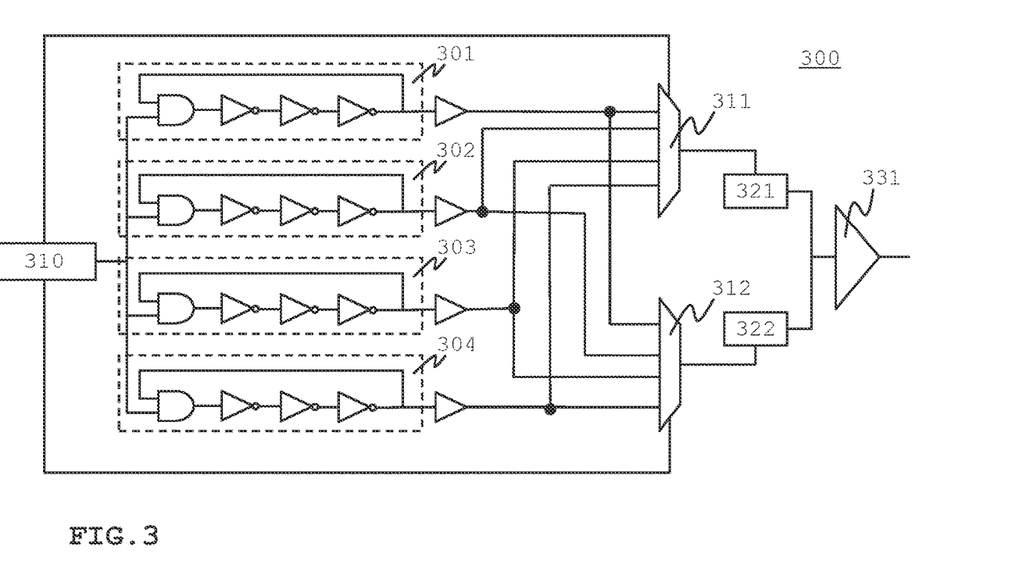
FIG. 3 is an illustrative block diagram of a PUF core for generating a PUF output according to some embodiments of the present disclosure.

FIG. 3 shows an illustrative embodiment of a delay-PUF 300, wherein four ROs 301-304 are raced. In this example a new Swiss Racing strategy for delay-PUFs is employed, which extracts maximal possible response bits with full information theoretic entropy, while not being susceptible to machine learning attacks. The inspiration is swiss style chess tournaments, where multiple rounds of races are held such that in each round previous round's winner (or losers) are raced against other winners (or losers) which do not share history with same opponents. Extending to RO-PUFs, since ROs with non-overlapping but same history of winning or losing are paired, even given multiple pairwise comparisons of each RO outcome of current race based on previous races cannot be predicted. Thus, response bits are full entropy since outcome of a race has full uncertainty (probability of either player winning is 0.5). There is a limit to number of rounds of race beyond which RO histories start overlapping and probability of an RO winning (or losing) given previous results is not 0.5 (not full entropy).

In the example of FIG. 3, a control circuitry 310 controls the ROs 301-303 and MUX 311, 312. In racing round 1a, RO 301 may be enabled, MUX 311 may be set to select RO 301, RO 302 may be enabled and MUX 312 may be set to select RO 302. In racing round 1b, RO 303 may be enabled, MUX 311 may be set to select RO 303, RO 304 may be enabled and MUX 312 may be set to select RO 304. In racing round 2, the winner of RO 301 and RO 302 may be enabled, MUX 311 may be set to select this winner of RO 301 and 302, the winner of RO 303 and RO 304 may be enabled and MUX 312 may be set to select this winner of RO 303 and RO 304. When selected pairs of ROs are enabled by the control circuitry 310, counter 321 may determine the frequency or count for the first of two selected ROs and counter 322 may determines the frequency or count for the second of two selected ROs. Comparator 331 determine the winner of the two selected ROs based on the output of the counters 321, 322.

In the example of FIG. 3, the extracted entropy from progressive rounds of Swiss Racing Strategy for n ROs is as follows:
- (n/2) bits of entropy can be obtained in the 1st round;
- (n/2r) bits of entropy per r-th round can be obtained up till round $\log_2(n)$.

The following algorithm may be applied to the example of FIG. 3 for j rounds of Swiss Racing Strategy for RO-PUFs:
1st Round: Race n/2 pairs against each other—e.g., RO1 301 vs RO2 302, RO3 303 vs RO4 304, . . . RON-1, RON (only four ROs are shown in FIG. 3, but this number can be extended to N);
Round j, $1<j<=\log_2(n)$: Race winner (or loser) of pair i from round j−1 with winner (or loser) of pair i+1 in j−1 round, for i=1, i=i+2, i<=n/2.

As can be seen from Table 1, a Swiss Racing strategy requires much fewer delay elements to produce the same number of response bits as traditional strategies and guarantees information theoretic full entropy. Challenge-Response based Strong-PUFs can produce more response bits than Swiss Racing strategy, however these are not guaranteed full entropy and open to machine learning attacks.

TABLE 1

| | Number of Entropy bits form n ROs | ROs for 128 entropy bits | Entropy bits from 128 ROs | Comments |
| --- | --- | --- | --- | --- |
| Elimination | n/2 | 256 | 64 | Full entropy |
| Round Robin Challenge Response | >n/2, <n (n(n − 1))/2 | >128 < 256 12 | >64 < 128 8128 | Not full entropy Not full entropy Machine Learning attacks possible |
| Modified Swiss Racing | (n/2r) per r-th round | 256 ROs and 1 round | 64 bits on round 1, 32 bits on round 2, Total of 96 bits for 2 rounds | Full entropy |

Example of Determining an Optimum Signal Path for a PUF

According to some embodiments of the present disclosure, an algorithm may be configured to choose an optimum configuration for 2 pairs of ROs such that the 3-bit output from these 4 ROs will remain stable over environmental variations. Intuitively, the output from racing 2 ROs will be stable if RO frequencies are spread farthest apart i.e., maximum delta between the frequencies. This algorithm measures the RO frequencies across all available configurations and picks a configuration for which is the worst race among three races (2 races from first round, 1 race from second round) has the best chance of remaining stable.

Figure 4:
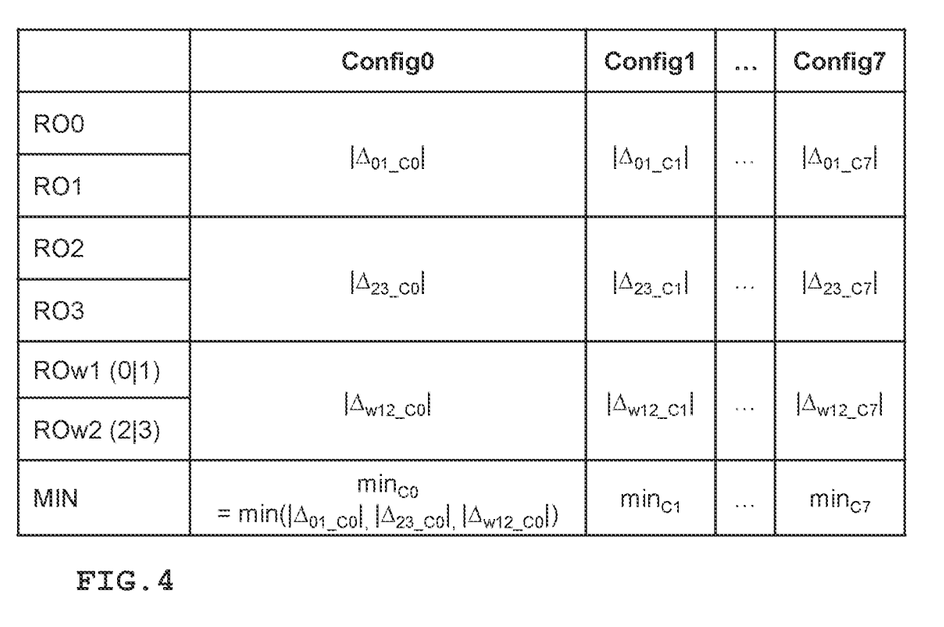
FIG. 4 is an illustrative table showing example criteria for racing winners and comparison metrics according to some embodiments of the present disclosure.

FIG. 4 shows a table with example criteria of racing winners and comparison metrics. The criteria and comparison metrics are used to determine the optimum signal path to be used in the PUF, typically a CRO-PUF.

In the first column the RO pairs are shown that are raced, i.e., the following RO pairs are raced according to FIG. 4: RO0 & RO1, RO2 & RO3, first winner of RO0 against RO1 (depicted ROw1 (0|1)) & second winner RO2 against RO3 (depicted ROw2 (2|3)). Columns 2 to 9 represent different configurations of the ROs, i.e., Config0-Config7 which are for example selectable by inputs C1-C3 to the MUX in the example of FIG. 1. In the table, count related values may be stored, which are shown as $|\Delta_{indication\ of\ ROs\_configuration}|$ in FIG. 4, wherein "indication of ROs" indicates the applicable ROs and "configuration" indicates the applicable configuration. For example, $|\Delta_{01\_C0}|$ represents the absolute value of the difference in RO frequencies as counted for RO0 and RO1 for configuration Config0. It will be understood that instead of frequency one may also use or refer to a count, as the frequency of outputs and the count of outputs have a similar meaning in the context of the present disclosure.

The last row is used to store comparison metrics based on criteria for selecting one of the count related values in each of the configurations. For example, the minimum difference in RO frequencies may be selected per configuration, in FIG. 4 defined as $\min_{configuration}$=min(differences in RO frequencies from the races for configuration). For example, $\min_{C0}$=min($|\Delta_{01\_C0}|$, $|\Delta_{23\_C0}|$, $|\Delta_{w12\_C0}|$) represents the minimum value for Config0 being equal to the minimum of the values $|\Delta_{01\_C0}|$, $|\Delta_{23\_C0}|$ and $|\Delta_{w12\_C0}|$.

From the comparison metrics for each of the configurations that are determined in the last row of FIG. 4, the optimum signal path, i.e., optimum configuration for the PUF can be determined. The optimum signal path may be determined to be the configuration that has the highest value of the comparison metric among all the signal paths, i.e., the configuration having the highest value in the last row of FIG. 4.

Figure 5:
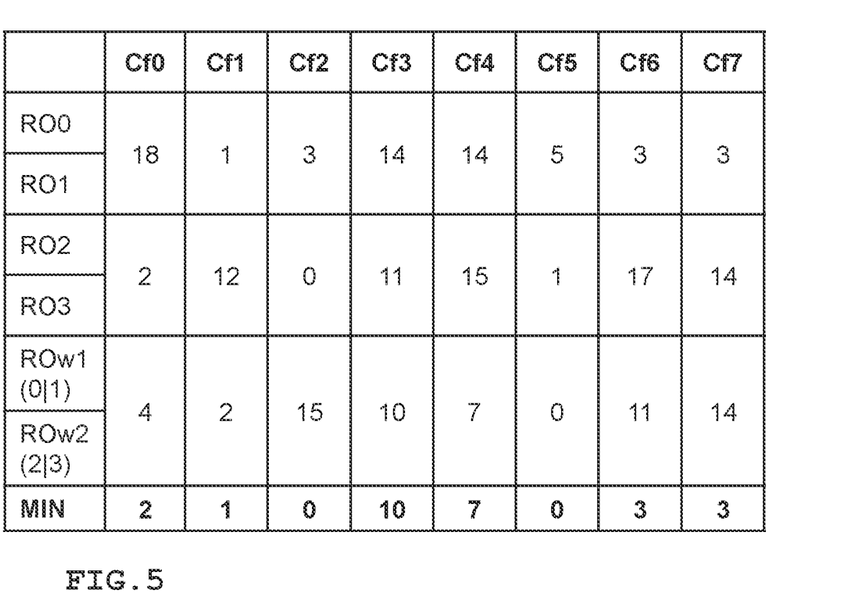
FIG. 5 is an illustrative table showing example values of racing winners and comparison metrics according to an example embodiment of the present disclosure.

FIG. 5 shows the example of FIG. 4 filled with values. In the example of FIG. 5, RO0-RO4 may be CROs similar to the CRO of FIG. 1, wherein different signal paths through the CRO may be set using inputs C1-C3 to MUX 111-113. Each RO0-R03 is set to the same signal path with each configuration. For each of the configurations Cf0-Cf7 three races are performed, i.e., between RO0 & RO1, RO2 & RO3, and the winners. One or more counters may keep track of the number of outputs produced by each of the ROs and the difference in output frequency or number of output counts is stored in the table. For example, in configuration Cf0 the difference in output frequency in the race between RO0 and RO1 is 18, the difference in output frequency in the race between RO2 and RO3 is 2 and the difference in output frequency in the race between the winners is 4. Note that in this table the actual counts per RO are not shown, as for the determination of the optimum configuration the actual counts are not needed and only the difference in counts may be used. For each configuration the minimum value is determined and stored in the last row. For example, in configuration Cf0 the minimum value comes from the race between RO2 and RO3 and equals 2.

From the minimum values the optimum signal path may be determined by selecting the configuration having the highest value in the last row. In the example of FIG. 5 the optimum configuration is thus determined to be Cf3, which has a minimum value of 10 and which is the highest of the minimum values in the last row.

The above algorithm ensures that RO frequencies of racing ROs would be spread farthest apart for the best case. Moreover, the worst race among the races has the best chance of remaining stable.

The PUF may be configuring to use the determined optimum signal path. Different PUFs may thus be configured to use a different optimum signal path, depending on the outcome of the algorithm for determining the optimum configuration, for example the algorithm used in FIG. 4. Different PUFs will typically have different optimum configurations due to the different path delays as a result of random manufacturing variations.

Example RO-PUF Core

Figure 6:
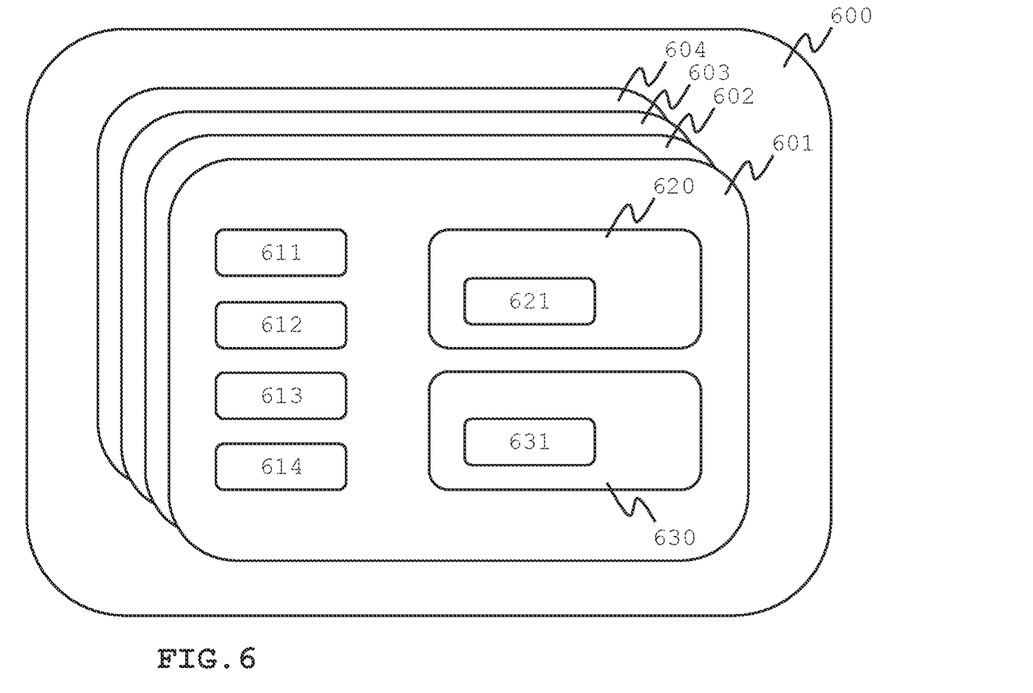
FIG. 6 is an illustrative ring oscillator based PUF core including submodules and functions according to some embodiments of the present disclosure.

FIG. 6 shows an illustrative embodiment of an RO-PUF core 600. Such RO-PUF core may be part of a digital controller that may be divided into different modules and submodules based on function. The RO-PUF core module 600 may be configured to include multiple RO-PUF sectors 601-604, each sector including a number of CROs that may be raced using racing functions 620, 630. The CROs may be similar to the CROs in the example of FIG. 2 or FIG. 3. An RO-PUF sector may include clock counters 611-614, wherein each clock counter may be assigned to a specific CRO of the CRO-PUF. Clock counter 611 is for example assigned to a first CRO that will be raced against a second CRO that uses clock counter 612. Racing these first and second CRO may be performed by racing function 620 and the end result may be stored by a racing history function 621. Clock counter 613 is for example assigned to a third CRO that will be raced against a fourth CRO that uses clock counter 614. Racing these third and fourth CRO may be performed by racing function 630 and the end result may be stored by a racing history function 631. The racing history is preferably for internal use and accessible by the digital controller only and not readable from outside the digital controller.

The digital controller may be configured to operate in a burn-in mode, wherein the controller iterates over all possible RO configurations and runs a racing strategy for each of these runs. The digital controller may operate in a config calibration mode, wherein each group of ROs (for example four ROs) will be evaluated for the optimum RO configuration for temperature drift. Each of the RO in the group may be run to get the count values and this may be repeated for a certain number (for example 100 times) and the sum of those count values may be obtained. After that, the sum of the count values for each pair (e.g., RO0 & RO1, RO2 & RO3) may be be compared and the absolute differences will be the first and second delta, respectively. A third delta may be computed by getting the absolute value of the difference of the sum of count values from the winners from each pair. The minimum of these deltas may be be saved. The whole procedure may be performed for all the single-path configurations. The configuration with the largest minimum delta may be determined as the optimum configuration for the ROs.

To allow testing for different power targets, the sectors 601-603 may be raced in different modes. In parallel mode all sectors may be active in parallel. In serial mode one sector is active at a time and after computation for a given round completes, a next sector may be activated.

To allow testing for different power targets, the ROs within a sector may be raced in different modes. In a pairwise racing mode, one pair may be racing, with two ROs active simultaneously. In an isolated racing mode, one RO may be active at a time and after count of first RO is registered, second RO may be activated (i.e., staggered racing).

In Table 2 an example is given of modes, and the number of bits of PUF response that may be generated in one cycle, as well as total number of cycles that may be required to complete one round of racing. It should be noted that in this example one cycle refers to the duration of one race (RO is running and its resulting frequency is captured by counter flops). It should be also noted that in this example only a certain part of the PUF response is used per round, which is why the number of entropy bits does not relate directly with the number of races.

TABLE 2

| No. of Sectors | No. of ROs per sector | Sector Mode | Race Mode | No. of Bits/ Cycle | Total Race Cycles for 1 Round | Comments |
|---|---|---|---|---|---|---|
| 4 (8 sub-sectors) | 64 (32 ROs per sub-sector) | Parallel | Pairwise | 8 | 16 | For 1st round, all results from race is valid. For $2^{nd}$ round, only half of the race results are valid. |
|  |  |  | Isolated | 4 | 32 | Same as above |
|  |  | Serial | Pairwise | 2 | 64 | Same as above |
|  |  |  | Isolated | 1 | 128 | Same as above |

The digital controller may be configured to operate in different second round modes. In a winners-only mode only winners of the first round are used in succeeding rounds. In a losers-only mode only losers of the first round are used in succeeding rounds.

According to some embodiments of the present disclosure, a chip may implement an RO-PUF, which compares frequencies of selected pairs of identically designed ROs to yield a binary response. Each RO block may include two parallel inverter chains with three inverters in series per-chain. An RO oscillates with the frequency determined by path delays through inverter and this path delay can be made configurable by selecting certain inverter path out of eight available inverter path configurations. The RO-PUF may be configured to generate 192-bit response from 256 on-chip ROs by running RO-PUF in a 2-round racing strategy. In the first round, two pairs of adjacent ROs may be raced to create two bits. In the second round, winners from first round may be raced to create another bit. Therefore, two pairs of ROs (four ROs) may create three unique bits.

Example Use of a PUF in a System

Figure 7:
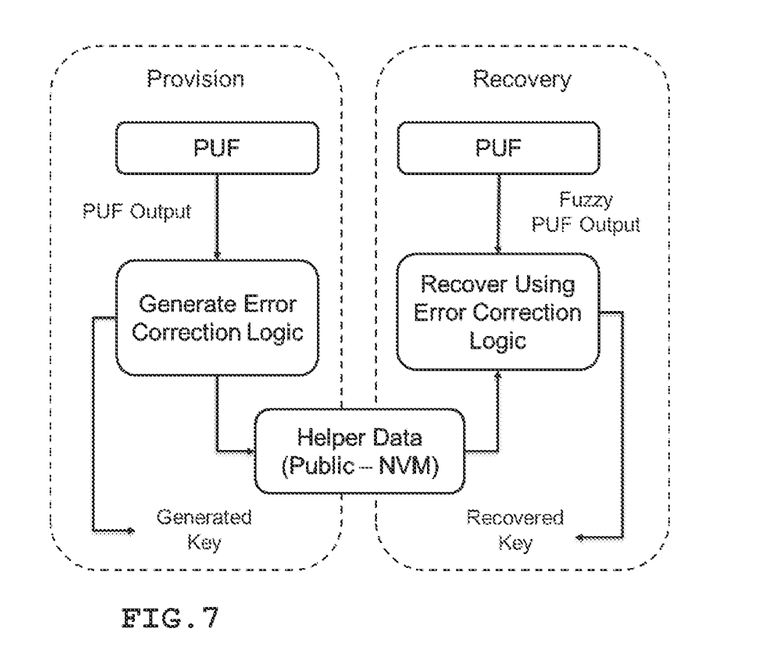
FIG. 7 is a flowchart of an example use of a PUF in a system according to some embodiments of the present disclosure.

PUFs may serve as a hardware root of trust in secure systems and may be used for key generation and storage. A system with a PUF would typically undergo two phases, as depicted in FIG. 7. A provisioning phase may be performed during manufacturing and a recovery phase may be performed whenever a PUF response is requested in the field. Responses from PUFs are typically susceptible to errors on reproduction based on environmental factors and hence are typically paired with error correction logic to be able to recover a specific response value. There are multiple schemes prevalent for error correction of PUF responses and are called secure sketches.

In a Provisioning phase the PUF may be queried to generate PUF Output. Helper Data may be generated for the PUF response, which aids in error correction in a later Recovery phase. The Helper Data may be stored publicly (for example in NVM), and the PUF response or a derivative thereof may serve as a Generated Key for the system.

In a Recovery phase the PUF may be queried again and the response (depicted Fuzzy PUF Output) may have errors due to change in environmental conditions. The stored Helper Data may be used to recover the originally Generated Key as the Recovered Key.

Example Method for Configuring a PUF

Figure 8:
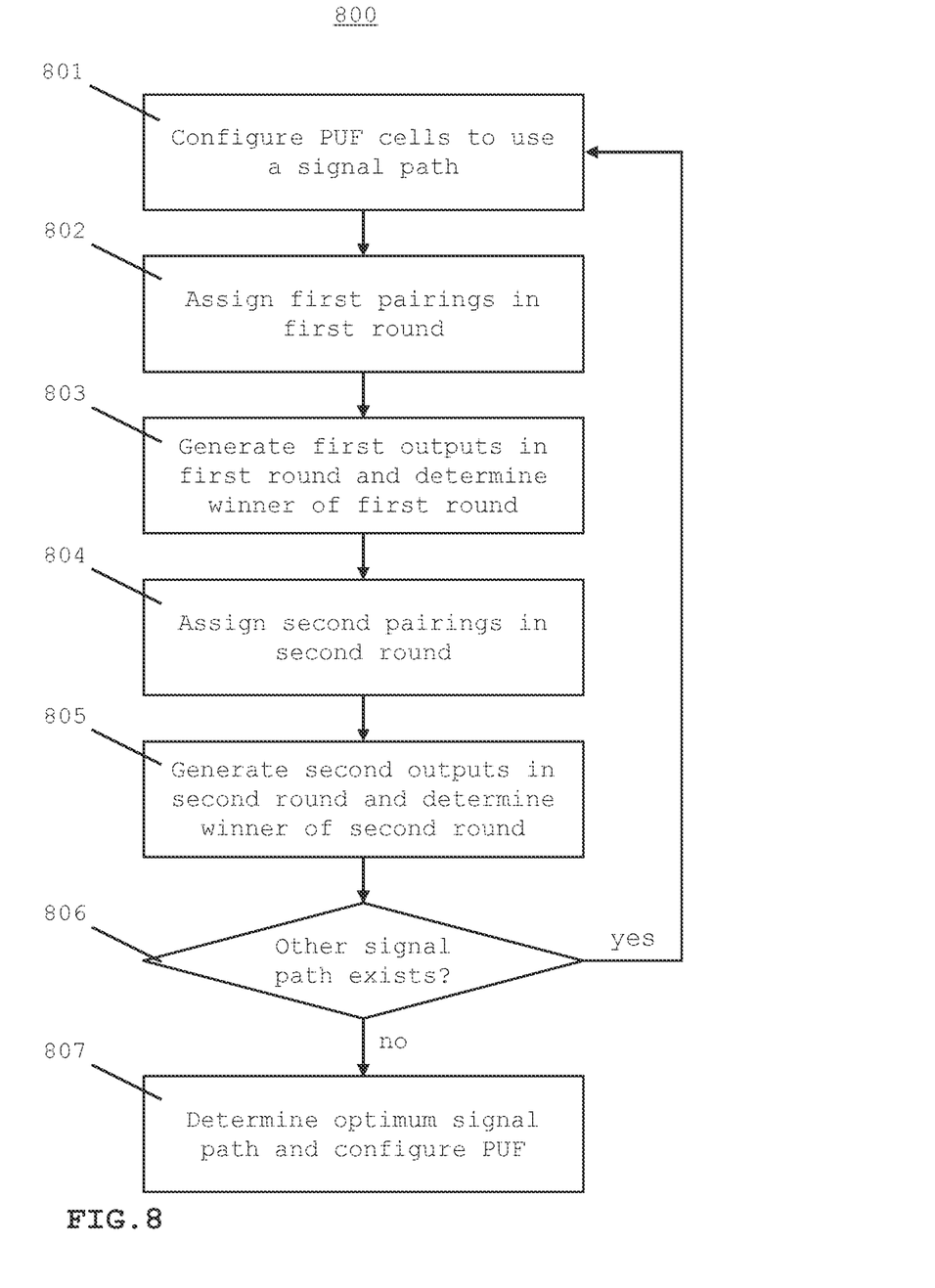
FIG. 8 is a flowchart of an example method for configuring a PUF according to some embodiments of the present disclosure.

FIG. 8 is a flowchart of an example method 800 for determining an optimum signal path and configuring a PUF to use the optimum signal path according to some embodiments of the present disclosure.

In step 801 PUF cells may be configured to use a specific signal path, e.g., one of the configurations shown in FIG. 4 in ROs in case of a CRO-PUF.

In step 802 at least one processor may assign, in a first round, first pairings of respective ones of a plurality of PUF cells, wherein each of the plurality of PUF cells is configured to use the configured signal path. Any feasible number of first pairings may be used. In the example of FIG. 1 two first pairings are used.

In step 803 respective first outputs from each of the plurality of PUF cells in the first round may be generated and a winner may be determined for each pair of PUF cells in the first pairings, wherein the winner for each pair of PUF cells in the first pairings is identified based on a count of first outputs generated by the respective PUF cells in the first pairings. The difference in output frequency of outputs between the PUF cells in the first pairings may be temporary stored in a memory, e.g., such as shown in FIG. 5.

In step 804 the at least one processor may assign, in a second round subsequent to the first round, second pairings of respective ones of the plurality of PUF cells based on the results of the first round. In the second round, depending on the configuration of the PUF, winners or losers from the first round may be used in the second pairings. In the example of FIG. 1 one second pairing is used.

In step 805 respective second outputs from each of the plurality of PUF cells in the second round may be generated and a winner may be determined for the second round including a winner for each pair of PUF cells in the second pairings. The winner for each pair of PUF cells in the second pairings may be identified based on a count of second outputs generated by the respective PUF cells in the second pairings. As in the first round, the difference in output frequency of outputs between the PUF cells in the second pairings may be temporary stored in a memory, e.g., such as shown in FIG. 5.

The first and second round may be repeated for multiple configurations, such as Conf0-Conf7 in FIG. 4. This is reflected by step 806. All available configurations may thus be processed. Alternatively, only a subset of all available configurations is processed.

In step 807, for each signal path common to the plurality of PUF cells in the first, second and repeated rounds, e.g., Conf0-Conf7 in FIG. 4, a comparison metric for the signal path may be determined. The comparison metric for the signal path may be based on the count of the outputs of the respective ones of the plurality of PUF cells having the signal path in common. In the example of FIG. 4 the comparison metric is shown in the last row and is defined to be the minimum value of the differences in the output frequencies per race and per configuration.

From the respective comparison metrics for the signal paths, the optimum signal path for the PUF may be determined and the PUF may be configured to use this optimum signal path.

Example Data Processing System

Figure 9:
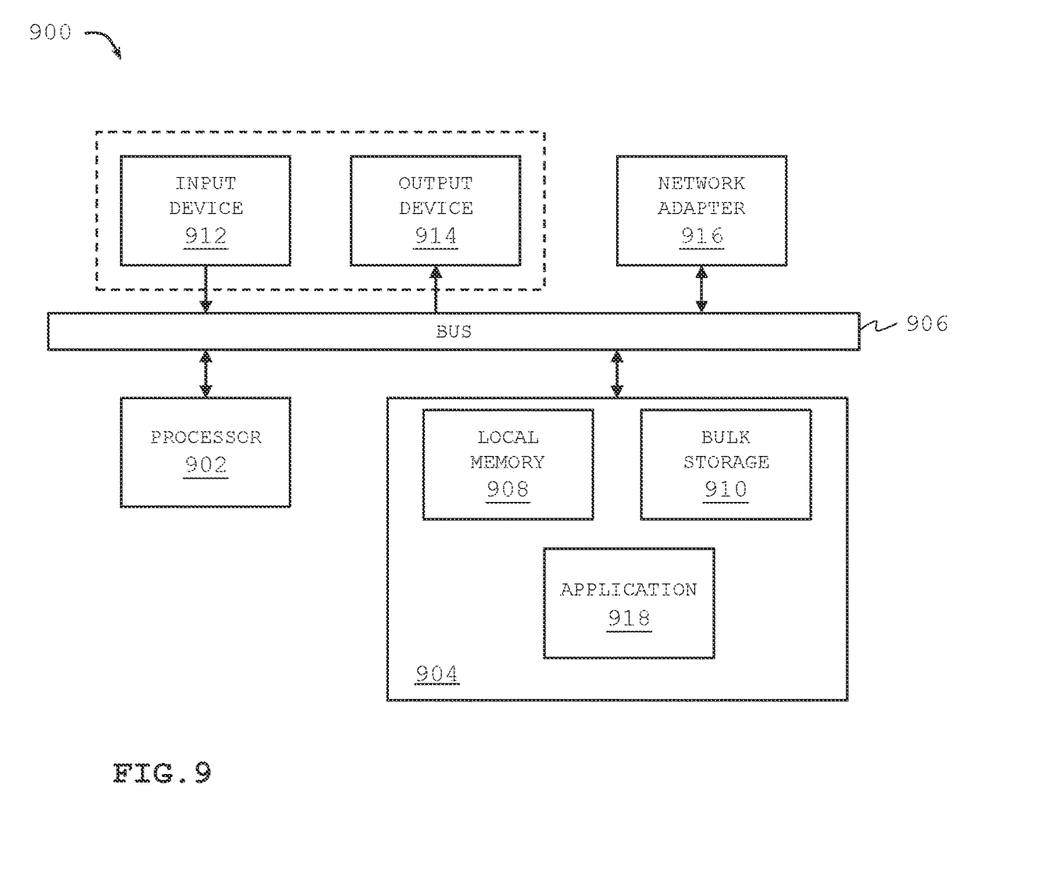
FIG. 9 provides a block diagram illustrating an example data processing system that may be configured to implement, or control, at least portions of operating a PUF, according to some embodiments of the present disclosure.

FIG. 9 provides a block diagram illustrating an example data processing system 900 that may be configured to control operation of one or more PUFs as described herein, according to some embodiments of the present disclosure. For example, the data processing system 900 may be configured to implement or control portions of operating one or more PUFs as described with reference to FIGS. 1-3 and FIGS. 6-7. In some embodiments, the data processing system 900 may be configured to implement at least portions of the control circuitry 310, shown in FIG. 3.

As shown in FIG. 9, the data processing system 900 may include at least one processor 902, e.g., a hardware processor 902, coupled to memory elements 904 through a system bus 906. As such, the data processing system may store program code within memory elements 904. Further, the processor 902 may execute the program code accessed from the memory elements 904 via a system bus 906. In one aspect, the data processing system may be implemented as a computer that is suitable for storing and/or executing program code. It should be appreciated, however, that the data processing system 900 may be implemented in the form of any system including a processor and a memory that is capable of performing the functions described within this disclosure.

In some embodiments, the processor 902 can execute software or an algorithm to perform the activities as discussed in the present disclosure, in particular activities related to configuring and/or operating one or more PUFs as described herein. The processor 902 may include any combination of hardware, software, or firmware providing programmable logic, including by way of non-limiting example a microprocessor, a digital signal processor (DSP), a field-programmable gate array (FPGA), a programmable logic array (PLA), an application specific integrated circuit (IC) (ASIC), or a virtual machine processor. The processor 902 may be communicatively coupled to the memory element 904, for example in a direct-memory access (DMA) configuration, so that the processor 902 may read from or write to the memory elements 904.

In general, the memory elements 904 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 900 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures, e.g., any elements illustrating PUFs as shown in FIGS. 1-3 and FIGS. 6-7, can also include suitable interfaces for receiving, transmitting, and/or otherwise communicating data or information in a network environment so that they can communicate with, e.g., the data processing system 900.

In certain example implementations, mechanisms operating PUFs as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as the memory elements 904 shown in FIG. 9, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as the processor 902 shown in FIG. 9, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 904 may include one or more physical memory devices such as, for example, local memory 908 and one or more bulk storage devices 910. The local memory may refer to RAM or other non-persistent memory device(s) generally used during actual execution of the program code. A bulk storage device may be implemented as a hard drive or other persistent data storage device. The processing system 900 may also include one or more cache memories (not shown) that provide temporary storage of at least some program code in order to reduce the number of times program code must be retrieved from the bulk storage device 910 during execution.

As shown in FIG. 9, the memory elements 904 may store an application 918. In various embodiments, the application 918 may be stored in the local memory 908, the one or more bulk storage devices 910, or apart from the local memory and the bulk storage devices. It should be appreciated that the data processing system 900 may further execute an operating system (not shown in FIG. 9) that can facilitate execution of the application 918. The application 918, being implemented in the form of executable program code, can be executed by the data processing system 900, e.g., by the processor 902. Responsive to executing the application, the data processing system 900 may be configured to perform one or more operations or method steps described herein.

Input/output (I/O) devices depicted as an input device 912 and an output device 914, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 914 may be any type of screen display, such as plasma display, liquid crystal display (LCD), organic light emitting diode (OLED) display, electroluminescent (EL) display, or any other indicator, such as a dial, barometer, or LEDs. In some implementations, the system may include a driver (not shown) for the output device 914. Input and/or output devices 912, 914 may be coupled to the data processing system either directly or through intervening I/O controllers.

In an embodiment, the input and the output devices may be implemented as a combined input/output device (illustrated in FIG. 9 with a dashed line surrounding the input device 912 and the output device 914). An example of such a combined device is a touch sensitive display, also sometimes referred to as a "touch screen display" or simply "touch screen". In such an embodiment, input to the device may be provided by a movement of a physical object, such as a stylus or a finger of a user, on or near the touch screen display.

A network adapter 916 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 900, and a data transmitter for transmitting data from the data processing system 900 to said systems, devices and/or networks. Modems, cable modems, and Ethernet cards are examples of different types of network adapter that may be used with the data processing system 900.

Select Examples

The following paragraphs provide various examples of the embodiments disclosed herein.

Example 1 provides a method for configuring a PUF. The method may include racing a plurality of PUF cells of the PUF in different signal path configurations to determine an optimum signal path for the PUF. The optimum signal path may be determined by determining a comparison metric for the different signal path configurations. The comparison metric for a signal path may be based on a count of outputs of the respective ones of the plurality of PUF cells in the signal path configuration. The method may further include configuring the PUF to use the optimum signal path.

Example 2 provides the method for configuring a PUF according to example 1. The method may include assigning by at least one processor, in a first round, first pairings of respective ones of a plurality of PUF cells. Each of the plurality of PUF cells may be configured to use a signal path. The method may further include generating, in the first round, respective first outputs from each of the plurality of PUF cells. Results may be determined for the first round including a winner for each pair of PUF cells in the first pairings. The winner for each pair of PUF cells in the first pairings may be identified based on a count of first outputs generated by the respective PUF cells in the first pairings. The method may further include assigning, in a second round subsequent to the first round, second pairings of respective ones of the plurality of PUF cells based on the results of the first round. The method may further include generating, in the second round, respective second outputs from each of the plurality of PUF cells. Results may be determined for the second round including a winner for each pair of PUF cells in the second pairings. The winner for each pair of PUF cells in the second pairings may be identified based on a count of second outputs generated by the respective PUF cells in the second pairings. The method may further include repeating the first round and the second round for different signal paths. The method may further include determining, for each signal path common to the plurality of PUF cells in the first, second and repeated rounds, a comparison metric for the signal path. The comparison metric for the signal path may be based on the count of the outputs of the respective ones of the plurality of PUF cells having the signal path in common. The method may further include determining an optimum signal path for the PUF from the respective comparison metrics for the signal paths. The method may further include configuring the PUF to use the optimum signal path.

Example 3 provides the method according to examples 1 or 2, wherein the plurality of PUF cells used in the first round and in the second round may be based on the same signal path.

Example 4 provides the method according to any one of the examples 1-3, wherein the winner in the first round may be the PUF cell having the highest count in a predefined time frame. The winner in the second round may be the PUF cell having the highest count in the predefined time frame. The comparison metric for the signal path may be the PUF cell having the lowest count. The optimum signal path may have the highest value of the comparison metric among all the signal paths.

Example 5 provides the method according to any one of the examples 1-4, wherein each PUF cell, of the plurality of PUF cells, may include one of a plurality of identically designed circuits, e.g., with differences stemming from manufacturing process variations.

Example 6 provides the method according to any one of the examples 1-5, wherein the configuring of the PUF may include storing data indicative of the optimum signal path in an NVM of the PUF for use by the PUF.

Example 7 provides the method according to any one of the examples 1-6, wherein each PUF cell may include an RO. The RO may include a series of an odd number of inverters. Different signal paths may include different combinations of inverters to thereby form a different series of inverters.

Example 8 provides the method according to any one of the examples 1-7, wherein the first and second outputs may represent binary values. The method may further include storing data representative of the comparison metric derived from the first and second outputs.

Example 9 provides the method according to example 8, wherein the data representative of the comparison metric may be stored for the optimum signal path, preferably only for the optimum signal path.

Example 10 provides the method according to any one of the examples 1-9, wherein the method may be performed upon manufacturing of the PUF.

Example 11 provides an electronic device. The electronic device may include a PUF. The PUF may include a plurality of PUF cells. The plurality of PUF cells may define different signal paths of the PUF. The electronic circuit may further include a control circuitry configured to determine an optimum signal path and configure the PUF to use this optimum signal path.

Example 12 provides the electronic device according to claim 11. The electronic device may further include at least one processor. The at least one processor may be configured to select pairings of respective ones of the plurality of PUF cells in a first round and a second round. The at least one processor may further be configured to race each pair of PUF cells in the first round and determine results for the first round including a winner for each pair of PUF cells in the first pairings. The winner for each pair of PUF cells in the first pairings may be identified based on a count of first outputs generated by the respective PUF cells in the first pairings. The at least one processor may further be configured to race each pair of PUF cells in the second round and determine results for the second round including a winner for each pair of PUF cells in the second pairings. The pair of PUF cells in the second round may be selected based on the results of the first round. The at least one processor may further be configured to repeat the first round and the second round for different signal paths. The at least one processor may further be configured to determine, for each signal path common to the plurality of PUF cells in the first, second and repeated rounds, a comparison metric for the signal path. The comparison metric for the signal path may be based on the count of the outputs of the respective ones of the plurality of PUF cells having the signal path in common. The at least one processor may further be configured to determine an optimum signal path for the PUF from the respective comparison metrics for the signal paths. The at least one processor may further be configured to configure the PUF to use the optimum signal path.

Example 13 provides the electronic device according to examples 11 or 12, further including an NVM. The at least one processor may be configured to configure the PUF by storing data indicative of the optimum signal path in the NVM for use by the PUF.

Example 14 provides the electronic device according to any one of the examples 11-13, wherein each PUF cell may include an RO. The RO may include a series of an odd number of inverters. Different signal paths may include different combinations of inverters to thereby form a different series of inverters.

Example 15 provides the electronic device according to any one of the examples 11-14, wherein each PUF cell may include a CRO configurable to use the signal path.

Example 16 provides the electronic device according to any one of the examples 11-15, wherein the plurality of PUF cells used in the first round and in the second round may be based on the same signal path.

Example 17 provides the electronic device according to any one of the examples 11-16, wherein the winner in the first round may be the PUF cell having the highest count in a predefined time frame. The winner in the second round may be the PUF cell having the highest count in the predefined time frame. The comparison metric for the signal path may be the PUF cell having the lowest count. The optimum signal path may have the highest value of the comparison metric among all the signal paths.

Example 18 provides the electronic device according to any one of the examples 11-17, wherein each PUF cell, of the plurality of PUF cells, may include one of a plurality of identically designed circuits, typically with differences stemming from manufacturing process variations.

Example 19 provides the electronic device according to any one of the examples 11-18, including a plurality of sectors. Each sector may include a plurality of PUF cells. The at least one processor may be configured to configure the PUF to use the optimum signal path for at least two of the respective plurality of PUF cells within a sector.

Example 20 provides the electronic device according to example 19, wherein the at least one processor may be configured to configure the PUF to use a different optimum signal path in each of the sectors.

Example 21 provides the electronic device according to example 19, wherein the plurality of PUF cells used in the first round and in the second round may be located in the same sector.

Example 22 provides an IC including a plurality of PUF cells forming a PUF. A signal path of the PUF cells may be configurable by at least one processor. The processor may be configured for racing pairs of PUF cells in a first round and determine a first round winner for each pair of PUF cells. The processor may further be configured for racing pairs of first round winners in a second round and determine a second round winner for each pair of first round winners. The processor may further be configured for repeating the first round and the second round for different signal paths. The processor may further be configured for determining, for each signal path common to the PUF cells in the first, second and repeated rounds, a comparison metric for the signal path. The processor may further be configured for determining an optimum signal path for the PUF from the respective comparison metrics. The processor may further be configured for configuring the PUF to use the optimum signal path.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

It is also imperative to note that all of the specifications, dimensions, and relationships outlined herein (e.g., the number of modules/systems, logic operations, etc.) have only been offered for purposes of example and teaching only. Such information may be varied considerably without departing from the spirit of the present disclosure, or the scope of the appended claims. The specifications apply only to some non-limiting examples and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the drawings may be combined in various possible configurations, all of which are clearly within the broad scope of the present disclosure.

Note that in the present description, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the present disclosure, to limit this disclosure in any way that is not otherwise reflected in the appended claims.

The invention claimed is:

1. An electronic device, comprising:
   a configurable physical unclonable function (PUF) comprising a plurality of ring oscillators and a plurality of multiplexers, wherein the plurality of multiplexers define different signal path configurations; and
   control circuitry to determine an optimum signal path configuration and configure the plurality of multiplexers to use the optimum signal path configuration, wherein the optimum signal path configuration corresponds to a signal path configuration that causes ring oscillator frequencies of racing pairs of ring oscillators to have maximum separation in frequency domain and further causes a worst race among races to have a greatest likelihood of remaining stable.

2. The electronic device according to claim 1, further comprising at least one processor configured to:
   select first pairings of ring oscillators to be raced in a first round;
   select second pairings of ring oscillators to be raced in a second round based on results of the first round; and
   repeat the first round and the second round for multiple signal path configurations.

3. The electronic device according to claim 2, further comprising a non-volatile memory, and wherein the at least one processor is further configured to store control signals corresponding to the optimum signal path configuration in the non-volatile memory.

4. The electronic device according to claim 2, wherein the first pairings of ring oscillators raced in a first round and second pairings of ring oscillators raced in the second round are based on a same signal path configuration.

5. The electronic device according to claim 2, further comprising:
   a plurality of sectors, wherein each sector comprises multiple ring oscillators, and wherein the at least one processor is further configured to use the optimum signal path configuration for at least two of the multiple ring oscillators within a sector.

6. The electronic device according to claim 5, wherein the at least one processor is further configured to configure the PUF to use a different optimum signal path configuration in each of the plurality of sectors.

7. The electronic device according to claim 5, wherein first pairs of ring oscillators raced in the first round and in the second round are located in a same sector.

8. The electronic device according to claim 1, wherein each ring oscillator of the plurality of ring oscillators comprises a series of an odd number of inverters, and wherein the respective signal path configurations comprise a first combination of the inverters forming a first series of inverters and a second combination of the inverters forming a second series of inverters.

9. The electronic device according to claim 1, wherein the determining the optimum signal path configuration comprises:
   storing first values resulting from racing a first pair of ring oscillators of the plurality of ring oscillators, the first values corresponding to respective ones of the different signal path configurations, wherein each one of the first values is indicative of a magnitude of a difference in ring oscillator frequencies counted for a first ring oscillator and a second ring oscillator of the first pair of ring oscillators in a respective one of the different signal path configuration;
   storing second values resulting from racing the second pair of ring oscillators of the plurality of ring oscillators, the second values corresponding to respective ones of the different signal path configurations, wherein each one of the second values is indicative of a magnitude of a difference in ring oscillator frequencies counted for a first ring oscillator and a second ring oscillator of the second pair of ring oscillators in a respective one of the different signal path configurations;
   determining, using the first values and the second values, values of a comparison metric for the different signal path configurations, wherein a particular value of the comparison metric for a particular signal path configuration corresponds to a minimum value of a particular one of the first values for the particular signal path configuration and a particular one of the second values for the particular signal path configuration; and
   determining the optimum signal path configuration for the PUF based on a second particular signal path configuration having a highest value for the comparison metric across the different signal path configurations.

10. The electronic device according to claim 1, further comprising a racing history function to store results of races.

* * * * *

UNITED STATES PATENT AND TRADEMARK OFFICE
CERTIFICATE OF CORRECTION

| | | |
|---|---|---|
| PATENT NO. | : 12,047,518 B2 | Page 1 of 1 |
| APPLICATION NO. | : 17/205561 | |
| DATED | : July 23, 2024 | |
| INVENTOR(S) | : Chiraag Juvekar et al. | |

It is certified that error appears in the above-identified patent and that said Letters Patent is hereby corrected as shown below:

On the Title Page

Item (73) the Assignee's state:
Delete "DE" and substitute therefor -- MA --.

Signed and Sealed this
First Day of October, 2024

Katherine Kelly Vidal
Director of the United States Patent and Trademark Office